(12) United States Patent
Doong et al.

(10) Patent No.: US 7,938,893 B2
(45) Date of Patent: May 10, 2011

(54) MEMBRANE REACTOR FOR $H_2S$, $CO_2$ AND $H_2$ SEPARATION

(75) Inventors: Shain-Jer Doong, Kildeer, IL (US);
Raja A. Jadhav, Naperville, IL (US);
Francis Lau, Darien, IL (US)

(73) Assignee: Gas Technology Institute, Des Plaines, IL (US)

( * ) Notice: Subject to any disclaimer, the term of this patent is extended or adjusted under 35 U.S.C. 154(b) by 841 days.

(21) Appl. No.: 11/511,057

(22) Filed: Aug. 28, 2006

(65) Prior Publication Data

US 2007/0240565 A1 Oct. 18, 2007

Related U.S. Application Data

(63) Continuation-in-part of application No. 11/406,695, filed on Apr. 18, 2006.

(51) Int. Cl.
*B03C 3/41* (2006.01)
(52) U.S. Cl. ......... 96/7; 96/4; 423/650; 55/318; 55/485; 55/486; 210/321.89
(58) Field of Classification Search .................... 96/7, 9, 96/11; 423/650; 55/485, 318, 308, 401, 55/486, 487, DIG. 5; 210/321.89, 300; 95/55
See application file for complete search history.

(56) References Cited

U.S. PATENT DOCUMENTS

| | | | | |
|---|---|---|---|---|
| 366,081 A | * | 7/1887 | Edgerton | 423/655 |
| 2,609,059 A | * | 9/1952 | Benedict | 95/55 |
| 4,435,289 A | * | 3/1984 | Breslau | 210/637 |
| 4,713,234 A | * | 12/1987 | Weirich et al. | 423/648.1 |
| 4,810,485 A | | 3/1989 | Marianowski et al. | |
| 4,836,833 A | * | 6/1989 | Nicholas et al. | 95/55 |
| 4,874,405 A | * | 10/1989 | Minhas | 96/9 |
| 4,925,549 A | * | 5/1990 | Robinson et al. | 208/65 |
| 5,229,102 A | | 7/1993 | Minet et al. | |
| 5,306,476 A | * | 4/1994 | Jalan et al. | 423/220 |
| 5,332,424 A | * | 7/1994 | Rao et al. | 95/47 |
| 5,451,386 A | | 9/1995 | Collins et al. | |
| 5,538,536 A | * | 7/1996 | Fuentes et al. | 95/45 |
| 5,599,383 A | * | 2/1997 | Dyer et al. | 96/8 |
| 5,888,273 A | * | 3/1999 | Buxbaum | 95/56 |
| 5,985,002 A | * | 11/1999 | Grantham | 95/47 |
| 6,207,132 B1 | | 3/2001 | Lin et al. | |

(Continued)

OTHER PUBLICATIONS

Webster's Third New International Dictionary, p. 750, 1981.*

(Continued)

*Primary Examiner* — Jason M Greene
*Assistant Examiner* — Anthony Shumate
(74) *Attorney, Agent, or Firm* — Mark E. Fejer

(57) ABSTRACT

A system for the selective removal of $CO_2$, $H_2S$, and $H_2$ from a gaseous fluid mixture comprising $CO_2$, $H_2S$, and $H_2$, which system includes a first membrane section having a nonporous metal oxide membrane, a second membrane section having a $CO_2$-selective membrane, and a third membrane section having an $H_2$-selective membrane. Each membrane section has a feed side and a permeate side and the membrane sections are arranged in series whereby the gaseous fluid mixture contacts the feed side, in sequence, of the first membrane section, the second membrane section and the third membrane section, resulting first in the separation or removal of $H_2S$, second in the separation or removal of $CO_2$, and third in the separation or removal of $H_2$. The process can be used to process synthesis gas generated from the gasification or reforming of carbonaceous materials for hydrogen production and carbon dioxide capture.

9 Claims, 3 Drawing Sheets

U.S. PATENT DOCUMENTS

| | | | |
|---|---|---|---|
| 6,221,117 | B1 | 4/2001 | Edlund et al. |
| 6,231,831 | B1 | 5/2001 | Autenrieth et al. |
| 6,511,521 | B1 * | 1/2003 | Parchamazad .................. 48/128 |
| 6,579,331 | B1 | 6/2003 | Ho |
| 6,632,266 | B2 | 10/2003 | Thomas et al. |
| 6,726,744 | B2 * | 4/2004 | Kulprathipanja et al. ......... 95/45 |
| 6,793,711 | B1 * | 9/2004 | Sammells .......................... 95/48 |
| 6,860,920 | B2 | 3/2005 | Simmons |
| 6,899,743 | B2 * | 5/2005 | Wijmans et al. ................... 95/50 |
| 6,919,062 | B1 * | 7/2005 | Vasileiadis et al. ......... 423/437.1 |
| 7,056,480 | B2 * | 6/2006 | Ogawa ........................... 422/197 |
| 7,404,843 | B2 * | 7/2008 | Kaschemekat et al. ............ 95/45 |
| 7,510,594 | B2 * | 3/2009 | Wynn et al. ........................ 95/45 |
| 2007/0072949 | A1 * | 3/2007 | Ruud et al. ..................... 518/702 |
| 2007/0130832 | A1 * | 6/2007 | Liu et al. ...................... 48/198.7 |
| 2007/0243127 | A1 * | 10/2007 | Fedorov et al. ............. 423/648.1 |

OTHER PUBLICATIONS

Lin "Novel Inorganic Membranes for High Temperature Carbon Dioxide Separation" 2003 <http://www.fischer-tropsch.org/DOE/DOE_reports/LinJS/40824/40824-final/40824-final.pdf>.* thefreedictionary.com, "end-to-end" < http://www.thefreedictionary.com/p/end-to-end>, 1 page (date unknown).*

Wiktionary, "end-to-end" < http://en.wiktionary.com/wiki/end-to-end>, 1 page 9 (date unknown).*

Wiktionary, "adjacent" <http://en.wiktionary.com/wiki/adjacent>, 1 page (date unknown).*

Liu, Paul T. K., "$CO_2$ Selective Ceramic Membrane for Water-Gas-Shift Reaction with Concomitant Recovery of $CO_2$", Final Report, U.S. Department of Energy, Jul. 15, 2005, pp. 44-83.

Chauk, Shriniwas, S. et al., "Kinetics of High-Pressure Removal of Hydrogen Sulfide Using Calcium Oxide Powder", *AIChE Journal*, vol. 46, No. 6, Jun. 2000, pp. 1157-1167.

Bhatia, S. K. et al., "Effect of the Product Layer on the Kinetics of the $CO_2$-Lime Reaction," *AIChE Journal*, vol. 29, No. 1, Jan. 1983, pp. 79-86.

Mess, Derek et al., "Product Layer Diffusion during the Reaction of Calcium Oxide with Carbon Dioxide," *Energy & Fuels*, 1999, 13, 999-1005.

Lin, Jerry Y. S., "Novel Inorganic Membranes for High Temperature Carbon Dioxide Separation", Final Technical Report, U.S. Department of Energy (Contract No. DE-FG26-00NT40824), Feb. 2003.

Nair, Balagopal N. et al., "Development of Lithium Zirconate Based Ceramic Materials and Membranes for High Temperature $CO_2$ Separation", Dept. of Chemical System Engineering, University of Japan, Tokyo (no date).

Kumakiri, Izumi et al., "Lithium Oxide Membranes for High Temperature CO2 Separation", (Abstract), Eighth International Conference on Inorganic Membranes, Jul. 2004.

Nair, B. N. et al., "Development of a Novel Membrane System Based on $Li_2ZrO_3$ for High Temperature $CO_2$ Separation", ICOM 2002, Jul. 2002, Book of Abstracts, p. 87.

Nair, B. N., et al., "Development of a Novel Membrane System for High Temperature $CO_2$ Separation", 34th Meeting of Chemical Eng. Society of Japan, Sep. 2001, Proceedings, p. 885.

Lin, Jerry Y. S. et al., "Dual Phase Membrane for High Temperature $CO_2$ Separation", Technical Progress Report, U.S. Dept. of Energy, (Contract No. DE-FG26-00NT41555) Mar. 2005.

* cited by examiner

MEMBRANE REACTOR FOR H₂S, CO₂ AND H₂ SEPARATION

BACKGROUND OF THE INVENTION

1. Field of the Invention

This invention relates to a process and system for separation of hydrogen sulfide ($H_2S$), carbon dioxide ($CO_2$), and hydrogen ($H_2$) from a fluid mixture comprising said hydrogen sulfide, carbon dioxide, and hydrogen. More particularly, this invention relates to a membrane reactor process and system that combines hydrogen sulfide removal, water-gas-shift reaction, hydrogen separation and carbon dioxide separation within a single system and, more particularly, within a single membrane configuration. The process and system of this invention is suitable for use in processing synthesis gas generated from gasification and reforming of carbonaceous materials for hydrogen production and carbon dioxide capture. After removal of hydrogen sulfide by the use of a front-end membrane section, the CO conversion of the water-gas-shift reaction from the synthesis gas stream is enhanced by the complementary use of two additional membranes to separate the carbon dioxide and hydrogen. By virtue of this invention, hydrogen production efficiency is increased, using a system having a smaller physical footprint and lower capital costs than can be achieved using conventional systems.

2. Description of Related Art

A conventional process for production of hydrogen is shown in FIG. 1. As shown therein, hydrogen can be produced in a reactor 10 from carbonaceous materials such as coal, biomass and petroleum coke by reaction with oxygen and steam in a gasification reactor under elevated temperatures, about 800-2000° C., or by natural gas reforming in which steam is reacted with natural gas in a catalytic reactor. The generated product gas from either gasification or reforming, referred to as synthesis gas or syngas, comprising mostly hydrogen and carbon monoxide, is then sent to a shift reactor 12 to convert the carbon monoxide to hydrogen by the water-gas-shift reaction. However, before it can be processed by the downstream shift reactor, the syngas from the gasification process requires gas cleanup in a gas cleaning system 11 to remove contaminants, in particular, sulfur compounds. After the shift reactor, the hydrogen is separated and purified in a pressure swing adsorption (PSA) unit 14 or by other similar hydrogen separation techniques. If necessary, carbon dioxide can be removed in a $CO_2$ removal unit 13 upstream of the PSA unit 14 to obtain a $CO_2$-enriched stream and increase the hydrogen recovery in the PSA unit.

A number of processes for the recovery or removal of a variety of gaseous mixture components from gas streams are known to those skilled in the art. Although the processes vary widely, they generally involve some form of solvent absorption, adsorption on a porous adsorbent, distillation, or diffusion through a semipermeable membrane.

Membranes are thin barriers that allow preferential passage of certain components of a multi-component gas mixture. Most membranes can be separated into two types: porous and nonporous. Porous membranes separate gases based on molecular size and/or differential adsorption by small pores in the membrane. Gas separation membranes used in natural gas applications are often nonporous or asymmetric and separate gases based on solubility and diffusivity. In a typical membrane separation process, a gas is introduced into the feed side of a module or vessel that is separated into two compartments by the permeable membrane. The gas stream flows along the surface of the membrane and the more permeable components of the gas pass through the membrane barrier at a higher rate than those components of lower permeability. After contacting the membrane, the depleted feed gas residue stream, known as the retentate, is removed from contact with the membrane by some suitable means. The gas on the other side of the membrane, the permeate, is removed from contact with the membrane through a separate means. By the term "permeate" is meant that portion of a feed stream which is withdrawn at the second side of the membrane, exclusive of other fluids such as sweep gas or liquid which may be present on the second side of the membrane.

U.S. Pat. No. 6,579,331 B1 teaches a $CO_2$-selective membrane process that is useful for the purification and/or water-gas-shift reaction of a reformed gas. The purification process selectively removes $CO_2$ from the reformed product, thereby enriching the reformed product in $H_2$ and increasing the $H_2/CO_2$ ratio. The $CO_2$ selective membrane is a composition comprising a hydrophilic polymer and at least one ammonium halide salt. Suitable hydrophilic polymers are indicated to include polyvinylalcohol, polyvinylpyrrolidone, polyethyleneoxide, polypropyleneoxide, polyacrylamide, polyvinylacetate and blends and copolymers thereof.

U.S. Pat. No. 6,860,920 B2 teaches gas separation membranes formed from polyester-polyether block copolymers which are useful for separating gases, especially polar gases from mixtures that contain both polar and non-polar components. In particular, the membranes are indicated to be suitable for removal of gases including $CO_2$, $H_2S$, and $SO_2$ from mixtures comprising non-polar gases such as helium, hydrogen, nitrogen or hydrocarbons.

U.S. Pat. No. 5,451,386 teaches a hydrogen-selective membrane comprising a tubular porous ceramic-support having a palladium metal layer deposited on an inside surface of the ceramic support. The membrane is suitable for separating hydrogen from feed gas mixtures comprising, in addition to hydrogen ($H_2$), carbon monoxide (CO), nitrogen ($N_2$), water ($H_2O$), hydrogen sulfide ($H_2S$) and ammonium ($NH_3$). See also U.S. Pat. No. 4,810,485, which teaches a hydrogen forming process and apparatus wherein one side of a hydrogen ion porous and molecular gas nonporous metallic foil is contacted with mixed gases comprising molecular hydrogen formed by a chemical reaction in a hydrogen production zone and the molecular hydrogen is dissociated and passed as ionic hydrogen to the other side of the metallic foil from which it is withdrawn; U.S. Pat. No. 5,229,102, which teaches a diffusion process from steam reforming of a hydrocarbon to produce $H_2$, CO and $CO_2$ in which a generally tubular, porous, ceramic membrane, having a catalytically active metallic substance, disposed in a heated reaction zone in a container is contacted on one side with a hydrocarbon-and steam-containing fluid stream to produce CO, $CO_2$, and $H_2$ and is exposed to a second fluid stream on its opposite side in such a manner so as to promote hydrogen diffusion through the membrane; U.S. Pat. No. 6,207,132 B1 which teaches an apparatus for producing hydrogen which includes a reforming chamber containing a reforming catalyst bed for reforming a carbonaceous fuel into hydrogen, at least one hydrogen-permeable membrane tube disposed inside the reforming chamber surrounded by the reforming catalyst bed and confining therein a hydrogen compartment, and at least one oxidation chamber adjacent to the reforming catalyst bed for burning gas not permeable to the membrane tube and for providing heat to the reforming chamber; U.S. Pat. No. 6,221,117 B1, which teaches a fuel processing system comprising a steam reformer which produces hydrogen from a feedstock consisting of water and alcohol and/or hydrocarbon feedstock, a reforming catalyst, and a hydrogen-selective membrane module; and U.S. Pat. No. 6,231,831 B1, which teaches a hydrogen separation membrane comprising palladium or palladium alloy.

It will be appreciated by those skilled in the art engaged in the study of membrane-gas separation processes and systems that gas separation membranes exist in a variety of forms depending upon the gas(es) to be removed and that the conditions under which the membranes operate vary widely, also dependent upon the gas(es) to be removed. For the removal of $H_2S$, $CO_2$ and $H_2$ from a gaseous mixture comprising these components, as evidenced herein above, there exist a variety of membranes and processes suitable for this purpose. However, no single process and system have been identified that are suitable for removal of all three of these components from a gaseous fluid mixture of which they are components.

SUMMARY OF THE INVENTION

Accordingly, it is one object of this invention to provide a membrane reactor process that combines $H_2S$ removal, water-gas-shift reaction, $CO_2$ separation and $H_2$ separation from a gaseous fluid mixture comprising these components in a single membrane configuration.

This and other objects of this invention are addressed by system for selective removal of $CO_2$, $H_2S$, and $H_2$ from a gaseous fluid mixture comprising said $CO_2$, $H_2S$, and $H_2$ comprising a first membrane section comprising a nonporous metal oxide membrane, a second membrane section comprising a $CO_2$-selective membrane, and a third membrane section comprising an $H_2$-selective membrane. Each membrane section has a feed side and a permeate side and the membrane sections are arranged in series whereby the gaseous fluid mixture contacts the feed side, in sequence, of the first membrane section, the second membrane section and the third membrane section, resulting first in the separation or removal of $H_2S$, second in the separation or removal of $CO_2$, and third in the separation or removal of $H_2$. The process can be used to process synthesis gas generated from the gasification or reforming of carbonaceous materials for hydrogen production and carbon dioxide capture. After the $H_2S$ is removed by the first membrane section, the CO conversion of the water-gas-shift reaction from the synthesis gas stream is enhanced by the complementary use of the $CO_2$-selective membrane and the $H_2$-selective membrane within a single reactor to separate the carbon dioxide and hydrogen.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

As used herein, the term "selective" when used in reference to membranes describes the propensity of the membrane to permit the transfer through the membrane of one component of a mixture to which the membrane is exposed relative to other components of the mixture. Thus, a $CO_2$-selective membrane is one which preferentially permits the transfer of $CO_2$ through the membrane relative to the transfer of other components, e.g. $H_2S$ and $H_2$, of the mixture.

The crux of the invention disclosed and claimed herein is the use of gas permeation membranes or membrane sections to separate $H_2S$, $CO_2$, and $H_2$ individually along with the water-gas-shift reaction within a single membrane module. The three membranes or membrane sections are arranged in such a way that the feed (the gaseous fluid mixture) and the retentate (that portion of the gaseous fluid mixture remaining after the separation or removal of one of the components of interest by the respective selective membrane) contact the feed sides of the three membranes or membrane sections in series while the individual permeates, $H_2S$, $CO_2$, and $H_2$, are obtained separately. In addition to being selective to $H_2S$, $CO_2$, and $H_2$, respectively, the three membranes or membrane sections are able to operate at substantially the same temperature and pressure, thereby allowing them to be housed in a single reactor vessel in accordance with one embodiment of this invention, reducing the floor plan and simplifying the overall operation compared to conventional systems performing the same separations.

Figure 2:
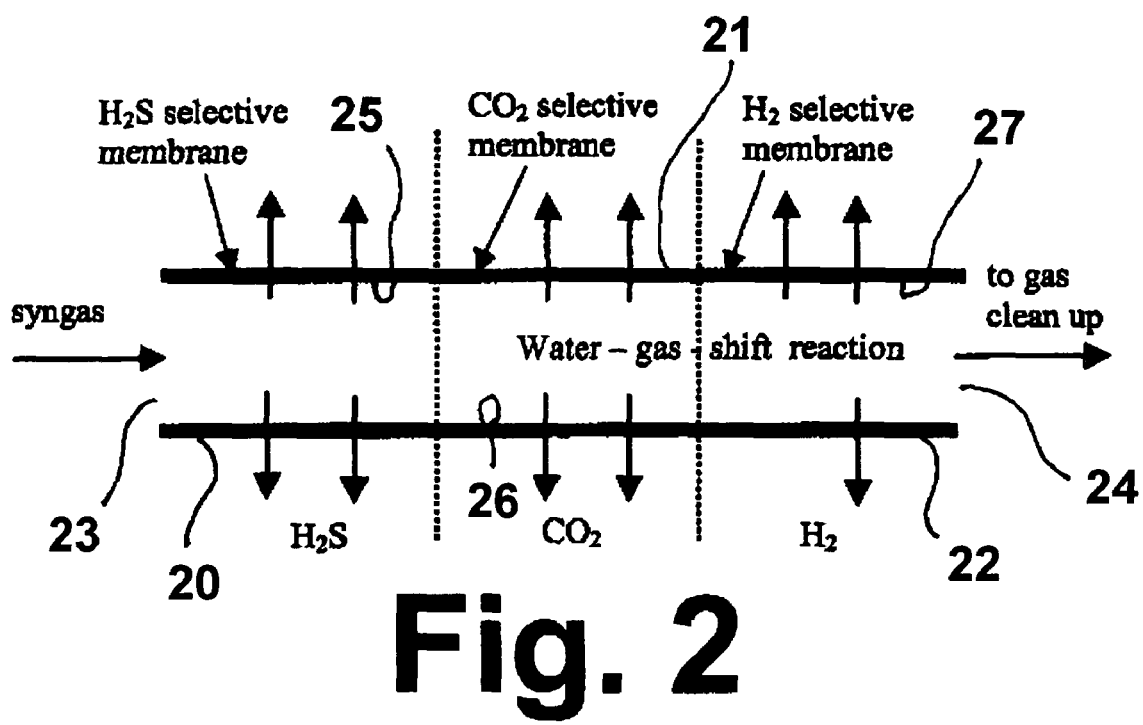
FIG. 2 is a schematic diagram of a complementary membrane configuration for $CO_2$ and $H_2$ separation with $H_2S$ removal.

Each of the three membranes or membrane sections is comprised of a material which renders the membrane or membrane section selective for the removal of one of $H_2S$, $CO_2$ and $H_2$. The membranes are arranged such that the first of the components removed from the gaseous fluid mixture is $H_2S$, the second of the components is $CO_2$, and the third of the components is $H_2$. FIG. 2 shows the membrane configuration in accordance with one embodiment of this invention. As shown therein, in accordance with a particularly preferred embodiment of this invention, the membrane sections are joined into a single tubular membrane suitable for disposition in a single reactor vessel. The membrane comprises, in sequence, $H_2S$-selective membrane section 20, $CO_2$-selective membrane section 21, and $H_2$-selective membrane section 22. The membrane sections, in accordance with a particularly preferred embodiment of this invention, are dense, nonporous membranes with close to 100% selectivity. Each membrane section comprises a feed side 25, 26, 27, which, in the embodiment shown, is the inside surface of the tubular membrane, and an opposite permeate side from which the permeate of interest is removed. In the embodiment shown, the gaseous fluid mixture is a synthesis gas which is introduced into an inlet end 23 of the tubular membrane and a retentate gas stream, from which $H_2S$, $CO_2$, and $H_2$ have been separated out, is exhausted from an outlet end 24 for transfer to a gas clean up process. It will be apparent to those skilled in the art that other membrane configurations exist, for example, planar membranes with suitable spacing between each membrane to enable the flow of the gaseous fluid mixture to contact the feed side of each membrane, in sequence, and to enable removal of the separated gaseous components from the respective permeate sides of the membranes, and such embodiments are deemed to be within the scope of this invention. It will also be apparent to those skilled in the art that the process and system of this invention, in addition to synthesis gases, may also be used in connection with other gaseous fluid mixtures comprising $H_2S$, $CO_2$, and $H_2$.

Membranes suitable for use in the method and system of this invention, in addition to being $H_2S$—, $CO_2$— and $H_2$-selective, must also be capable of operating under the conditions, i.e. temperature and pressure, at which the gaseous fluid mixture is introduced into the system. For synthesis gas produced in a gasification process, the operational temperatures are in the range of about 600° C. to about 1000° C. For gaseous fluid mixtures derived from a fuel reforming process, the operational temperatures are typically in the range of about 500° C. to about 900° C. The operational pressures are in the range of about 10 to about 100 atm., preferably in the range of about 20 to about 60 atm.

Membranes suitable for use in the separation of $H_2S$ from the gaseous fluid mixture in accordance with one embodiment of this invention are nonporous (dense) membranes comprising at least one metal oxide. For gaseous fluid streams having temperatures in the range of about 600° C. to about 1000° C., the preferred metal oxides are calcium-based, such as CaO. In accordance with another embodiment of this invention, the membrane comprises CaS. For temperatures in the range of about 300° C. to about 600° C., the preferred metal oxides are zinc-based, such as ZnO.

For $CO_2$ separation, the preferred membrane comprises at least one of a dense metal carbonate and a dense metal oxide wherein the metal is selected from the group consisting of Ca, Mg, Ba, Sr, Cd, Mn, Fe, Zn, Co, Ni, and combinations thereof. In accordance with one particularly preferred embodiment of this invention, the at least one dense metal carbonate is selected from the group consisting of $CaCO_3$, $MgCO_3$, $Ca-Mg(CO_3)_2$ and combinations thereof. Of the gaseous components remaining in the gaseous fluid mixture following removal of $H_2S$ therefrom, the dense carbonate membranes allow only $CO_2$ in the form of carbonate ions to diffuse through and exclude all other gas species present in the gaseous mixture, including hydrogen. Thus, the method of this invention can achieve 100% selectivity for $CO_2$ on the permeate side of the membranes. The membranes can operate at higher temperatures (greater than 200° C.) than conventional membranes to enable higher diffusion flux for the carbonate ($CO_3^{2-}$) ions. Thus, the membranes of this invention are suitable for use in applications for $CO_2$ separation from fuel/flue gas or synthesis gas at higher temperatures without the need of gas cooling. They can be used as a membrane reactor with the water-gas-shift reaction to increase hydrogen production by removing the equilibrium limitation. The catalysts of the water-gas-shift reaction may be eliminated if the membrane reactor is operated at sufficiently high temperatures (greater than about 500° C.).

For hydrogen separation, ceramic materials of the perovskite type are known to have virtually infinite selectivity to hydrogen in the temperature range of about 600° C. to about 1000° C. and, thus, are well suited for the third membrane section of the system in accordance with one embodiment of this invention. When operating at above about 600° C., the water gas shift reaction can take place without the need for catalysts in accordance with the following equation:

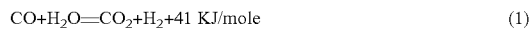

As indicated by Equation (1) herein above, the water-gas-shift reaction is exothermic. Thus, equilibrium CO conversion is higher at lower operating temperatures, e.g. 200° C. to 300° C. While both $CO_2$ and $H_2$ are removed from the syngas by the two complementary membrane sections of this invention, the water-gas-shift reaction is more favorable for the production of $H_2$ and $CO_2$. Thus, the conversion of CO can be increased without being limited by its reaction equilibrium, even at temperatures between about 600° C. to about 1000° C. If necessary, catalysts can be added to the inside of the membrane module to promote further the steam-methane reforming reaction of $CH_4$ to $H_2$ in accordance with the following equation:

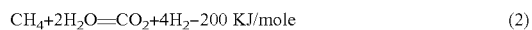

For temperatures in the range of about 300° C. to about 600° C., magnesium-based metal carbonates or oxide dense membranes are particularly suitable for $CO_2$ separation. Palladium or its alloy materials, which have infinite selectivity to hydrogen, can be used for the third membrane section of the process and system of this invention for the separation of $H_2$. For operating temperatures less than about 600° C., catalysts may be needed to facilitate the water-gas-shift reaction.

EXAMPLE

Figure 1:
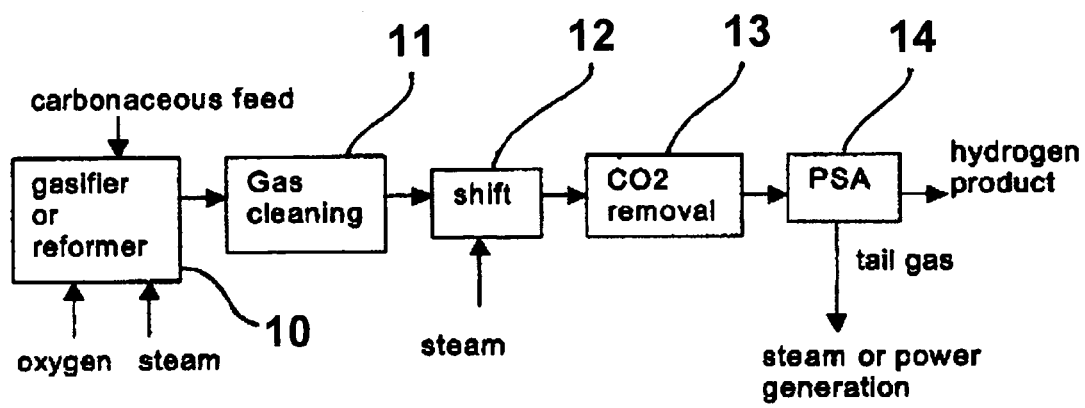
FIG. 1 is a schematic diagram of a conventional process for production of hydrogen in a process for gasification or reforming of a carbonaceous material.
Figure 3:
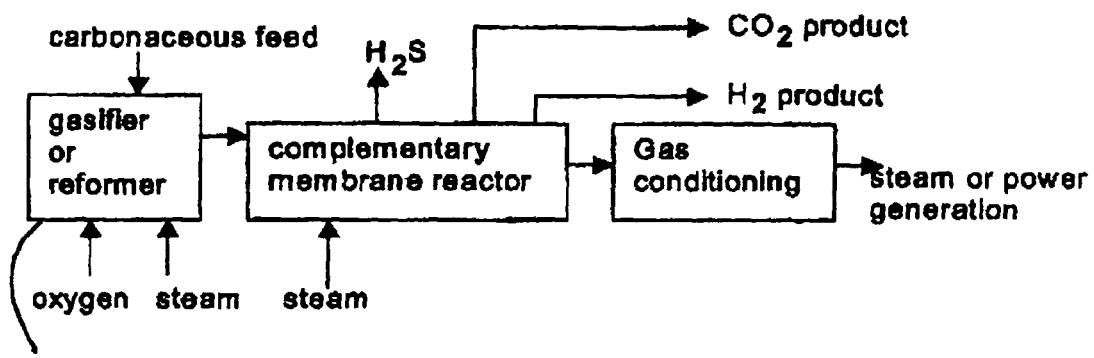
FIG. 3 is a schematic diagram of a gasification system for hydrogen production using the complementary membrane reactor configuration in accordance with one embodiment of this invention.

An Illinois #6 coal is gasified in a gasifier at a rate of about 100,000 lbs/hr, operating at a temperature of about 1000° C. and a pressure of about 30 atm. Steam is provided to the gasifier at a steam/carbon mole ratio of about 0.66 and oxygen is provided to the gasifier at a rate so as to provide an oxygen/carbon mole ratio of about 0.42. Based on the assumptions of thermodynamic equilibrium for all chemical reactions in the system, calculations were performed for four different process schemes: (A) the conventional process without the use of any membrane unit as shown in FIG. 1; (B) the current invention process in which a complementary membrane reactor configuration is employed as shown in FIGS. 2 and 3; (C) the same process as in process (B) but without the use of the $H_2$ membrane in the membrane reactor configuration of FIG. 2; and (D) the same process as the process (B) except without the use of the $CO_2$ membrane in the membrane reactor configuration of FIG. 2. The Ca-based membrane is used for the $CO_2$ separation and the perovskite membrane is used for the hydrogen separation. The membrane reactors are operating at temperatures of about 760° C. without the use of any catalyst.

The pressures of the feed side of the membrane sections are at about 30 atm. For the hydrogen-selective membranes, the pressure of the permeate side is maintained at about 1 atm. Therefore, to maintain a positive pressure gradient across the membrane, the non-permeate synthesis gas stream exiting the $H_2$ membrane has a $H_2$ partial pressure of about 1 atm. For the $CO_2$-selective membranes, the partial pressure of the $CO_2$ at the permeate side needs to be below about 0.1 atm to ensure calcination of the $CaCO_3$ on the permeate side according to the $CO_2$ equilibrium pressure for the carbonation reaction. The non-permeate synthesis gas stream exiting from the $CO_2$ membrane will have a partial pressure of about 0.3 atm for $CO_2$ to prevent calcination of the membrane material. Additional steam is added to the water-gas-shift reactor for the membrane shift reactors at a steam/carbon mole ratio of 0.4. The hydrogen recovery for the PSA unit in the conventional coal to $H_2$ process is assumed to be 80%.

The raw synthesis gas generated from gasification of the Illinois #6 coal also contains about 0.8% by weight of $H_2S$. The use of a CaO membrane with a complementary membrane reactor as in process B also reduces the $H_2S$ down to about a 100 ppm level according to a thermodynamic equilibrium calculation.

The following table compares the results for the above four processes in terms of the number of moles for the hydrogen and carbon dioxide products. Also shown in the table are the amounts and the compositions of the gas that need downstream gas cleanup or further gas conditioning. The numbers in the table are all normalized to the hydrogen product for the process A.

|  | A. Conventional Coal to $H_2$ | B. Complementary Membrane | C. $CO_2$ Membrane only | D. $H_2$ membrane only |
|---|---|---|---|---|
| $H_2$, moles | 100 | 130 | 112 | 116 |
| $CO_2$, moles |  | 81 | 81 |  |
| To gas cleanup, moles | 201 | 27 | 157 | 115 |
| $H_2$ % | 33.1 | 3.6 | 79.2 | 3.6 |
| $CH_4$ % | 0.5 | 4.0 | 0.7 | 0.9 |
| CO | 32.3 | 1.7 | 4.7 | 9.1 |
| $CO_2$ % | 12.1 | 31.5 | 1.0 | 64.7 |
| $H_2O$ % | 22.0 | 59.2 | 14.5 | 21.7 |

As can be seen, the conventional process (A) needs to handle the largest amount of gas in the downstream separation units. Process B, which uses the complementary membrane reactor process of this invention, can produce the highest amount of $H_2$ product with an additional pure $CO_2$ byproduct ready for sequestration. After both $H_2$ and $CO_2$ have been separated from the raw synthesis gas stream, only about 15% of the gas volume remaining requires further conditioning, such as for removal of trace amounts of sulfur or other heavy metals. Use of the $CO_2$ membrane reactor without the complementary use of the $H_2$ membrane, as in Process C, results in pure $CO_2$ product and a $H_2$ enriched stream that requires further purification. If 90% of the $H_2$ can be recovered from this purification process, the total $H_2$ product is about 12% higher than the conventional coal to $H_2$ process. On the other hand, the use of the $H_2$ membrane reactor without the complementary use of the $CO_2$ membrane, as in Process D, results in a pure $H_2$ product that is about 10% lower in quantity than the complementary membrane reactor process of this invention. The advantage of the process and system of this invention can clearly be seen from its high hydrogen production rate and the low residual gas flow that needs further conditioning.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A system for selective removal of $CO_2$, $H_2S$, and $H_2$ from a fluid mixture comprising said $CO_2$, $H_2S$, and $H_2$, the system comprising:
    an $H_2S$-selective nonporous metal oxide membrane;
    a $CO_2$-selective membrane;
    an $H_2$-selective membrane;
    each said membrane having a feed side, a permeate side, a fluid inlet end, and a fluid outlet end; and
    said membranes touching end-to-end whereby said fluid mixture flows into said inlet ends, in sequence, and contacts said feed side, in sequence, of said $H_2S$-selective membrane, said $CO_2$-selective membrane and said $H_2$-selective membrane.

2. A system in accordance with claim 1, wherein said $H_2S$-selective nonporous metal oxide membrane comprises a metal selected from the group consisting of Ca, Mg, Ba, Sr, Cd, Mn, Fe, Zn, Co, Ni, and combinations thereof.

3. A system in accordance with claim 1, wherein said $CO_2$-selective membrane is a nonporous metal carbonate membrane.

4. A system in accordance with claim 3, wherein said nonporous metal carbonate membrane comprises a metal selected from the group consisting of Ca, Mg, Ba, Sr, Cd, Mn, Fe, Zn, Co, Ni, and combinations thereof.

5. A system in accordance with claim 1, wherein said membranes are disposed within a single reactor vessel.

6. A system in accordance with claim 4, wherein said nonporous metal carbonate membrane is one of disposed on a surface of a porous substrate and disposed within an interior of said porous substrate.

7. A system in accordance with claim 6, wherein substantially all pores of said porous substrate have pore sizes "less than 1000 nm in diameter".

8. A system in accordance with claim 7, wherein said pore sizes are less than 20 nm in diameter or equal to about 20 nm in diameter.

9. A system in accordance with claim 1, wherein each said membrane has a tubular shape.

* * * * *